(12) United States Patent
Cho et al.

(10) Patent No.: US 7,389,963 B2
(45) Date of Patent: Jun. 24, 2008

(54) DISPLAY APPARATUS

(75) Inventors: Nam-il Cho, Suwon (KR); Sung-ki Min, Suwon (KR); Young-tai Kim, Yongin (KR); Soon-haeng Heo, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/646,864

(22) Filed: Aug. 25, 2003

(65) Prior Publication Data
US 2004/0035994 A1 Feb. 26, 2004

(30) Foreign Application Priority Data
Aug. 24, 2002 (KR) ............ 10-2002-0050351

(51) Int. Cl.
*G06F 1/16* (2006.01)
(52) U.S. Cl. .......... 248/159; 248/276.1; 248/917; 248/919; 361/681
(58) Field of Classification Search ........... 248/276.1, 248/622, 469, 474, 122.1, 125.8, 404, 414, 248/159, 917, 919; 361/681, 682; 188/237
See application file for complete search history.

(56) References Cited

U.S. PATENT DOCUMENTS

| | | | |
|---|---|---|---|
| 2,041,370 A | | 5/1936 | Pottorff |
| 2,042,443 A | * | 5/1936 | Buckstone .......... 248/411 |
| 2,628,142 A | | 2/1953 | Dubach |
| 2,890,010 A | * | 6/1959 | Barkheimer .......... 108/7 |
| 3,285,207 A | * | 11/1966 | Vom Hagen .......... 108/146 |
| 3,434,684 A | * | 3/1969 | Warden .......... 248/592 |
| 3,788,587 A | * | 1/1974 | Stemmler .......... 248/562 |
| 4,113,215 A | | 9/1978 | Stapleton |
| 4,166,522 A | * | 9/1979 | Bourcier de Carbon ..... 188/287 |
| 4,235,405 A | | 11/1980 | Carey |
| 4,329,800 A | * | 5/1982 | Shuman .......... 40/606.14 |
| 4,339,104 A | | 7/1982 | Weidman |
| 4,395,010 A | * | 7/1983 | Helgeland et al. .......... 248/371 |
| 4,438,458 A | | 3/1984 | Münscher |
| 4,447,031 A | | 5/1984 | Souder, Jr. et al. |

(Continued)

FOREIGN PATENT DOCUMENTS

CN 1031010 C 2/1996

(Continued)

OTHER PUBLICATIONS

U.S. Appl. No. 10/295,831, filed Nov. 18, 2002, Hyun-jun Jung et al., Samsung Electronics Co, Ltd.

(Continued)

*Primary Examiner*—Anita M. King
(74) *Attorney, Agent, or Firm*—Staas & Halsey LLP

(57) ABSTRACT

A display apparatus having: a display main body provided with a screen; a base member supporting the display main body; and a cylinder assembly provided between the display main body and the base member to liftably support the display main body, wherein the cylinder assembly exerts a supporting force at least as great as a weight of the display main body. Thus, the present invention offers the display apparatus with a simple structure capable of fine variation of a height of the display main body. Further, the display main body is lifted easily with a small force.

21 Claims, 16 Drawing Sheets

U.S. PATENT DOCUMENTS

| | | | |
|---|---|---|---|
| 4,601,246 A | 7/1986 | Damico | |
| 4,616,218 A * | 10/1986 | Bailey et al. | 361/682 |
| 4,669,694 A | 6/1987 | Malick | |
| 4,690,362 A | 9/1987 | Helgeland | |
| 4,691,886 A | 9/1987 | Wedling et al. | |
| 4,729,533 A | 3/1988 | Hillary et al. | |
| D295,415 S | 4/1988 | Thies et al. | |
| 4,768,744 A | 9/1988 | Leeds et al. | |
| 4,777,750 A | 10/1988 | Garfinkle | |
| 4,834,329 A | 5/1989 | Delapp | |
| 4,846,434 A | 7/1989 | Krogsrud | |
| 4,859,092 A | 8/1989 | Makita | |
| 4,864,601 A | 9/1989 | Berry | |
| 4,924,931 A | 5/1990 | Miller | |
| D313,405 S | 1/1991 | Barry et al. | |
| 4,989,813 A | 2/1991 | Kim et al. | |
| 5,012,852 A | 5/1991 | Blackhurst | |
| 5,088,676 A | 2/1992 | Orchard et al. | |
| 5,102,084 A | 4/1992 | Park | |
| 5,107,402 A | 4/1992 | Malgouires | |
| 5,112,019 A | 5/1992 | Melzler et al. | |
| 5,144,290 A | 9/1992 | Honda et al. | |
| 5,163,652 A | 11/1992 | King | |
| 5,206,790 A | 4/1993 | Thomas et al. | |
| D337,104 S | 7/1993 | Orchard | |
| D349,489 S | 8/1994 | Wang | |
| 5,335,142 A | 8/1994 | Anderson | |
| 5,383,138 A | 1/1995 | Motoyama et al. | |
| 5,422,951 A | 6/1995 | Takahashi et al. | |
| 5,437,236 A * | 8/1995 | Zeiner | 108/147 |
| 5,549,264 A | 8/1996 | West | |
| 5,634,537 A * | 6/1997 | Thorn | 188/300 |
| 5,751,548 A * | 5/1998 | Hall et al. | 361/686 |
| 5,758,849 A | 6/1998 | Bui et al. | |
| 5,771,152 A | 6/1998 | Crompton et al. | |
| 5,799,917 A | 9/1998 | Li | |
| 5,812,368 A | 9/1998 | Chen et al. | |
| 5,835,342 A | 11/1998 | Hunte | |
| 5,876,008 A | 3/1999 | Sweere et al. | |
| 5,894,633 A | 4/1999 | Kaneko | |
| 5,911,523 A | 6/1999 | Burchart | |
| 5,924,665 A | 7/1999 | Sweere et al. | |
| 5,941,493 A | 8/1999 | Cheng | |
| 5,947,429 A | 9/1999 | Sweere et al. | |
| 5,975,472 A * | 11/1999 | Hung | 248/278.1 |
| 5,992,809 A | 11/1999 | Sweere et al. | |
| 5,997,493 A | 12/1999 | Young | |
| 6,012,693 A | 1/2000 | Voeller et al. | |
| 6,015,120 A | 1/2000 | Sweere et al. | |
| 6,018,847 A | 2/2000 | Lu | |
| 6,031,714 A | 2/2000 | Ma | |
| 6,062,148 A | 5/2000 | Hodge et al. | |
| 6,064,373 A | 5/2000 | Ditzik | |
| 6,081,420 A | 6/2000 | Kim et al. | |
| 6,113,046 A | 9/2000 | Wang | |
| 6,116,690 A * | 9/2000 | Larson | 297/344.19 |
| 6,134,103 A | 10/2000 | Ghanma | |
| 6,145,797 A | 11/2000 | Uehara | |
| 6,164,611 A | 12/2000 | Kuhnke | |
| 6,168,124 B1 | 1/2001 | Matsuoka et al. | |
| 6,189,842 B1 | 2/2001 | Bergeron Gull et al. | |
| 6,189,849 B1 | 2/2001 | Sweere et al. | |
| 6,189,850 B1 | 2/2001 | Liao et al. | |
| 6,231,021 B1 | 5/2001 | Hong | |
| 6,233,138 B1 | 5/2001 | Osgood | |
| 6,266,794 B1 | 7/2001 | Harbin | |
| 6,270,047 B1 | 8/2001 | Hudson | |
| 6,276,655 B1 | 8/2001 | Byoun | |
| 6,288,891 B1 | 9/2001 | Hasegawa et al. | |
| 6,305,659 B1 | 10/2001 | Metelski | |
| 6,326,955 B1 | 12/2001 | Ditzik | |
| 6,347,433 B1 | 2/2002 | Novin et al. | |
| 6,352,226 B1 | 3/2002 | Gordon | |
| 6,367,756 B1 * | 4/2002 | Wang | 248/278.1 |
| 6,378,830 B1 | 4/2002 | Lu | |
| 6,381,125 B1 * | 4/2002 | Mizoguchi et al. | 361/682 |
| 6,390,433 B1 | 5/2002 | Kasa-Djukic | |
| 6,394,403 B1 | 5/2002 | Hung | |
| 6,397,761 B1 * | 6/2002 | Moore | 108/50.01 |
| 6,402,109 B1 | 6/2002 | Dittmer | |
| 6,409,134 B1 | 6/2002 | Oddsen, Jr. | |
| 6,419,196 B1 | 7/2002 | Sweere et al. | |
| 6,430,038 B1 | 8/2002 | Helot et al. | |
| 6,478,275 B1 | 11/2002 | Huang | |
| 6,494,150 B1 | 12/2002 | Phoenix et al. | |
| 6,499,704 B2 | 12/2002 | Oddsen, Jr. | |
| 6,502,792 B1 | 1/2003 | Cho et al. | |
| 6,522,530 B2 | 2/2003 | Bang | |
| 6,532,628 B2 | 3/2003 | Kim | |
| 6,585,201 B1 | 7/2003 | Reed | |
| 6,592,090 B1 * | 7/2003 | Li | 248/284.1 |
| 6,601,810 B2 | 8/2003 | Lee | |
| 6,609,272 B1 | 8/2003 | Lee | |
| 6,609,686 B2 | 8/2003 | Malizia | |
| 6,672,533 B1 | 1/2004 | Lin | |
| 6,680,843 B2 | 1/2004 | Farrow et al. | |
| 6,695,266 B1 | 2/2004 | Tsai | |
| 6,695,274 B1 | 2/2004 | Chiu | |
| 6,698,063 B2 | 3/2004 | Kim et al. | |
| 6,702,238 B1 * | 3/2004 | Wang | 248/125.8 |
| 6,708,940 B2 | 3/2004 | Ligertwood | |
| 6,712,321 B1 | 3/2004 | Su et al. | |
| D489,370 S | 5/2004 | Jobs et al. | |
| 6,766,994 B2 | 7/2004 | Serbinski et al. | |
| 6,769,657 B1 | 8/2004 | Huang | |
| 6,796,541 B2 | 9/2004 | Lu | |
| 6,819,550 B2 | 11/2004 | Jobs et al. | |
| 6,822,857 B2 | 11/2004 | Jung et al. | |
| 6,837,469 B2 | 1/2005 | Wu et al. | |
| 6,857,610 B1 * | 2/2005 | Conner et al. | 248/284.1 |
| 6,874,743 B2 | 4/2005 | Watanabe et al. | |
| 6,889,958 B2 | 5/2005 | Hoffend, Jr. | |
| 6,905,099 B2 | 6/2005 | Sung | |
| 6,954,221 B2 | 10/2005 | Wu | |
| 7,055,218 B2 | 6/2006 | Lu et al. | |
| 7,168,655 B2 | 1/2007 | Morita | |
| 7,168,665 B2 * | 1/2007 | Hong et al. | 248/125.1 |
| 7,177,144 B2 | 2/2007 | Ha et al. | |
| 7,195,214 B2 * | 3/2007 | Lee et al. | 248/125.8 |
| 7,237,755 B2 | 7/2007 | Cho et al. | |
| 7,274,555 B2 | 9/2007 | Kim et al. | |
| 2001/0017761 A1 | 8/2001 | Ditzik | |
| 2002/0011544 A1 | 1/2002 | Bosson | |
| 2002/0020792 A1 | 2/2002 | Lee | |
| 2002/0130981 A1 | 9/2002 | Ma et al. | |
| 2003/0075649 A1 | 4/2003 | Jeong et al. | |
| 2003/0075653 A1 | 4/2003 | Li | |
| 2003/0080949 A1 | 5/2003 | Ditzik | |
| 2003/0086240 A1 | 5/2003 | Jobs et al. | |
| 2003/0132360 A1 | 7/2003 | Ju | |
| 2003/0142474 A1 | 7/2003 | Karidis et al. | |
| 2004/0011932 A1 | 1/2004 | Duff | |
| 2004/0056161 A1 | 3/2004 | Ishizaki et al. | |
| 2004/0057197 A1 | 3/2004 | Hill et al. | |
| 2004/0084585 A1 | 5/2004 | Watanabe et al. | |
| 2004/0084588 A1 | 5/2004 | Liu et al. | |
| 2004/0118984 A1 | 6/2004 | Kim et al. | |
| 2006/0219849 A1 | 10/2006 | Chiu | |

FOREIGN PATENT DOCUMENTS

| | | |
|---|---|---|
| CN | 2504675 | 8/2002 |
| DE | 2847135 | 5/1980 |
| DE | 39 43 137 A1 | 8/1991 |

| | | | | | |
|---|---|---|---|---|---|
| DE | 4214341 A1 * | 11/1993 | JP | 20026990 | 1/2002 |
| DE | 200 09 691 | 11/2000 | KR | 1989-3755 | 6/1989 |
| DE | 4214341 A1 | 7/2003 | KR | 88-3444 | 10/1989 |
| EP | 0 046 225 | 2/1982 | KR | 1989-20328 | 10/1989 |
| EP | 244 566 | 11/1987 | KR | 1991-0009310 | 5/1991 |
| EP | 631 174 B1 | 4/1998 | KR | 114350 | 11/1997 |
| EP | 1085753 | 3/2001 | KR | 1997-63717 | 12/1997 |
| GB | 2 206 464 | 1/1989 | KR | 1998-4698 | 3/1998 |
| JP | 57-151990 | 9/1982 | KR | 163133 | 9/1998 |
| JP | 61-99873 | 5/1986 | KR | 1998-54989 | 12/1998 |
| JP | 61-99874 | 5/1986 | KR | 1999-40596 | 6/1999 |
| JP | 61-196314 | 8/1986 | KR | 1999-0040596 | 6/1999 |
| JP | 62-96681 | 5/1987 | KR | 1999-0073869 | 10/1999 |
| JP | 62-96682 | 6/1987 | KR | 20-168389 | 11/1999 |
| JP | 62-239677 | 10/1987 | KR | 2000-722 | 1/2000 |
| JP | 1-273086 | 10/1989 | KR | 2000-725 | 1/2000 |
| JP | 2-58783 | 4/1990 | KR | 2000-827 | 1/2000 |
| JP | 2-215408 | 8/1990 | KR | 20-182808 | 3/2000 |
| JP | 02-215408 | 8/1990 | KR | 20-184275 | 3/2000 |
| JP | 03-2381 | 1/1991 | KR | 20-0178710 | 4/2000 |
| JP | 03-29800 | 3/1991 | KR | 20-0191805 | 8/2000 |
| JP | 3-29800 | 3/1991 | KR | 20-215332 | 12/2000 |
| JP | 3-095586 | 4/1991 | KR | 2000-73608 | 12/2000 |
| JP | 3-113423 | 11/1991 | KR | 2000-0074849 | 12/2000 |
| JP | 03-113423 | 11/1991 | KR | 10-0289438 | 2/2001 |
| JP | 3-114875 | 11/1991 | KR | 2002-5136 | 2/2001 |
| JP | 03-114875 | 11/1991 | KR | 20-227925 | 4/2001 |
| JP | 4-15680 | 1/1992 | KR | 20-227953 | 4/2001 |
| JP | 4-33073 | 3/1992 | KR | 2001-0035722 | 5/2001 |
| JP | 04-33073 | 3/1992 | KR | 20-0227925 | 6/2001 |
| JP | 04-81182 | 3/1992 | KR | 20-239991 | 7/2001 |
| JP | 4-81182 | 3/1992 | KR | 2001-53963 | 7/2001 |
| JP | 4-107284 | 4/1992 | KR | 2001-56960 | 7/2001 |
| JP | 4-155375 | 5/1992 | KR | 2001-83865 | 9/2001 |
| JP | 4-198979 | 7/1992 | KR | 20-251611 | 10/2001 |
| JP | 3-017022 | 9/1992 | KR | 20-0253576 | 11/2001 |
| JP | 4-132517 | 12/1992 | KR | 20-0256013 | 11/2001 |
| JP | 5-36523 | 2/1993 | KR | 20-256809 | 11/2001 |
| JP | 1993-23576 | 3/1993 | KR | 20-259625 | 12/2001 |
| JP | 5-097098 | 4/1993 | KR | 20002-5136 | 1/2002 |
| JP | 5-36423 | 5/1993 | KR | 2002-0029616 | 4/2002 |
| JP | 05-36423 | 5/1993 | KR | 20-279427 | 6/2002 |
| JP | 5-188865 | 7/1993 | KR | 20-0279427 | 6/2002 |
| JP | 05-66715 | 9/1993 | KR | 10-353035 | 9/2002 |
| JP | 6-4778 | 1/1994 | KR | 20-295990 | 11/2002 |
| JP | 64778 | 1/1994 | KR | 20-304340 | 2/2003 |
| JP | 6-37912 | 2/1994 | KR | 2003-0058204 | 7/2003 |
| JP | 6-21079 | 3/1994 | KR | 2001-35722 | 5/2007 |
| JP | 6-118880 | 4/1994 | | | |
| JP | 8-121009 | 5/1996 | | | |
| JP | 8-234672 | 9/1996 | | | |
| JP | 8-319753 | 12/1996 | | | |
| JP | 10-126068 | 5/1998 | | | |
| JP | 10-214034 | 8/1998 | | | |
| JP | 10-228333 | 8/1998 | | | |
| JP | 11-006520 | 1/1999 | | | |
| JP | 11-095866 | 4/1999 | | | |
| JP | 11-154460 | 6/1999 | | | |
| JP | 11-214859 | 8/1999 | | | |
| JP | 11-338576 | 12/1999 | | | |
| JP | 2000-019981 | 1/2000 | | | |
| JP | 2000-56695 | 2/2000 | | | |
| JP | 3068198 | 2/2000 | | | |
| JP | 2000-122561 | 4/2000 | | | |
| JP | 2000-206893 | 7/2000 | | | |
| JP | 2000-206901 | 7/2000 | | | |
| JP | 2000-242363 | 9/2000 | | | |
| JP | 3073553 | 9/2000 | | | |
| JP | 2000267581 | 9/2000 | | | |
| JP | 2001-50244 | 2/2001 | | | |
| JP | 2001-142407 | 5/2001 | | | |
| JP | 2001-202026 | 7/2001 | | | |
| JP | 2001-241427 | 9/2001 | | | |

OTHER PUBLICATIONS

U.S. Appl. No. 10/314,350, filed Dec. 1, 2002, Sang-kyeong Ha et al., Samsung Electronics Co. Ltd.
U.S. Appl. No. 10/671,605, filed Sep. 1, 2003, Jun-soo Jeong, Samsung Electronics Co. Ltd.
U.S. Appl. No. 10/671,863, filed Sep. 1, 2003, Ju-hwan Kim et al., Samsung Electronics Co. Ltd.
U.S. Appl. No. 10/694,029, filed Oct. 1, 2003, Nam-il Cho et al., Samsung Electronics Co. Ltd.
U.S. Appl. No. 10/694,041, filed Oct. 1, 2003, You-Sub Lee et al., Samsung Electronics Co. Ltd.
U.S. Appl. No. 10/705,770, filed Nov. 1, 2003, Ju-hwan Kim et al., Samsung Electronics Co. Ltd.
U.S. Appl. No. 10/792,745, filed Mar. 1, 2004, Sang-kyeong Ha et al., Samsung Electronics Co. Ltd.
U.S. Appl. No. 10/916,436, filed Aug. 12, 2004, Hyun-jun Jung et al., Samsung Electronics Co, Ltd.
U.S. Appl. No. 10/916,447, filed Aug. 12, 2004, Hyun-jun Jung et al., Samsung Electronics Co, Ltd.
U.S. Appl. No. 10/406,269, filed Apr. 4, 2003, You-sik Hong et al., Samsung Electronics Co, Ltd.
Vesa Mounting Interface Standard, Mar. 19, 2003, 2 pages, www.ergotron.com/2_Product_pages/FP_ARMS/VESA/fp_vesa.asp.

Third Party Submission document filed Aug. 27, 2004 in Korean Industrial Property Office, issued Sep. 22, 2004.
Chinese Office Action of Application No. 03110326.X issued Sep. 24, 2004.
Chinese Office Action of Application No. 03154931.4 issued Sep. 9, 2005.
Singapore Office Action issued on May 13, 2005.
Korean Office Action issued on Jul. 26, 2004.
Japanese Office Action mailed Sep. 21, 2004 in JP 2002-333914.
Japanese Office Action mailed Jun. 14, 2005 in JP 2002-333914.
Korean Office Action issued on Mar. 16, 2005.
Korean Office Action issued on Aug. 20, 2004.
SIPO Office Action issued on Sep. 9, 2005.
Korean Office Action issued on Mar. 8, 2006 in Korean Patent Application No. 10-2002-0050351 which corresponds to U.S. Appl. No. 10/646,864.
Japanese Office Action issued in Japanese Patent Application No. 2005-360909.
Japanese Office Action issued in Japanese Patent Application No. 2005-360911.
Japanese Office Action issued in Japanese Patent Application No. 2005-360915.
Korean Patent Office Action, mailed Oct. 19, 2007 and issued in corresponding Korean Patent Application No. 2002-0069680.
U.S. Appl. No. 11/889,998, filed Aug. 17, 2007, Ju-hwan Kim et al., Samsung Electronics Co., Ltd.

* cited by examiner

DISPLAY APPARATUS

CROSS-REFERENCE TO RELATED APPLICATIONS

This application claims the benefit of Korean Patent Application No. 2002-50351, filed Aug. 24, 2002, in the Korean Intellectual Property Office, the disclosure of which is incorporated herein by reference.

BACKGROUND OF THE INVENTION

1. Field of the Invention

The present invention relates to a display apparatus, and more particularly, to a display apparatus improved in a lifting structure of a display main body.

2. Description of the Related Art

In general, a display apparatus has a display main body provided with a screen, and a base member that supports the display main body.

Recently, a display main body is provided with a screen by using display elements such as an LCD (liquid crystal display) or a PDP (plasma panel display). These are thinner and lighter monitors than conventional monitors, and they occupy a comparatively small space.

Hereinafter, a display apparatus with a display main body provided with a LCD panel, and a base member on a horizontal plane, such as a table is described.

Such a display has a lifting unit lifting the display main body vertically with respect to the horizontal base member. In Japanese patent first publication No. 2000-206893, a lifting unit for a display main body to adjust the height of the display main body is disclosed. This conventional lifting unit uses an air cylinder assembly and includes a height positioning part positioning a display main body provided with latch grooves and a latch means.

But in the conventional display apparatus, the height positioning part for the display main body has to be provided. Thus, the structure becomes complicated and it is not easy for a user to use the display.

Further, in the conventional display apparatus, the height of the display main body can be varied only at the latch grooves, so that fine height positioning can not be achieved.

In the conventional display apparatus, a supporting frame is provided for supporting the display main body. But it is difficult to prevent the display main body from being shaken when lifting it only by the supporting frame.

SUMMARY OF THE INVENTION

Accordingly, it is an aspect of the present invention to provide a display apparatus with an improved lifting structure of a display main body.

Additional aspects and advantages of the invention will be set forth in part in the description which follows and, in part, will be obvious from the description, or may be learned by practice of the invention.

The foregoing and/or other aspects of the present invention are achieved by providing a display apparatus having: a display main body provided with a screen; a base member supporting the display main body; and a cylinder assembly provided between the display main body and the base member to liftably support the display main body, wherein the cylinder assembly exerts a supporting force which is at least as great as a weight of the display main body.

According to an aspect of the invention, the cylinder assembly comprises: a pressurized cylinder combined with the base member; a piston slidably provided in the cylinder; and a cylinder rod with a bottom combined with an upper surface of the piston and a top combined with the display main body.

According to an aspect of the invention, the display apparatus further comprises a rod supporter, with a top combined with an upper end part of the cylinder rod and a bottom contacting a circumference of the cylinder, to be lifted as a single body with the cylinder rod.

According to an aspect of the invention, the display apparatus further comprises a cylinder supporter combined with the base member to accommodate and support the cylinder.

According to an aspect of the invention, the display apparatus further comprises at least one auxiliary cylinder assembly provided between the display main body and the base member.

According to an aspect of the invention, the auxiliary cylinder assembly comprises: a hollow guide pipe combined with the base member, and a guide rod slidably provided in the guide pipe.

According to an aspect of the invention, the display apparatus further comprises a cylinder supporter combined with the base member to accommodate and support the cylinder and the guide pipe.

According to an aspect of the invention, a plurality of cylinder assemblies are provided.

According to an aspect of the invention, the display apparatus further comprises a cylinder bracket provided between the display main body and the cylinder assembly, which is respectively combined with the display main body and the base member.

According to an aspect of the invention, the display apparatus further comprises a cylinder bracket provided between the display main body and the cylinder assembly which is respectively combined with a rear of the display main body and the base member.

According to an aspect of the invention, the cylinder assembly comprises: a pressurized cylinder combined with the base member; a piston slidably provided in the cylinder; and a cylinder rod with a bottom combined with an upper end part of the piston and a top combined with the cylinder bracket.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION

Figure 1:
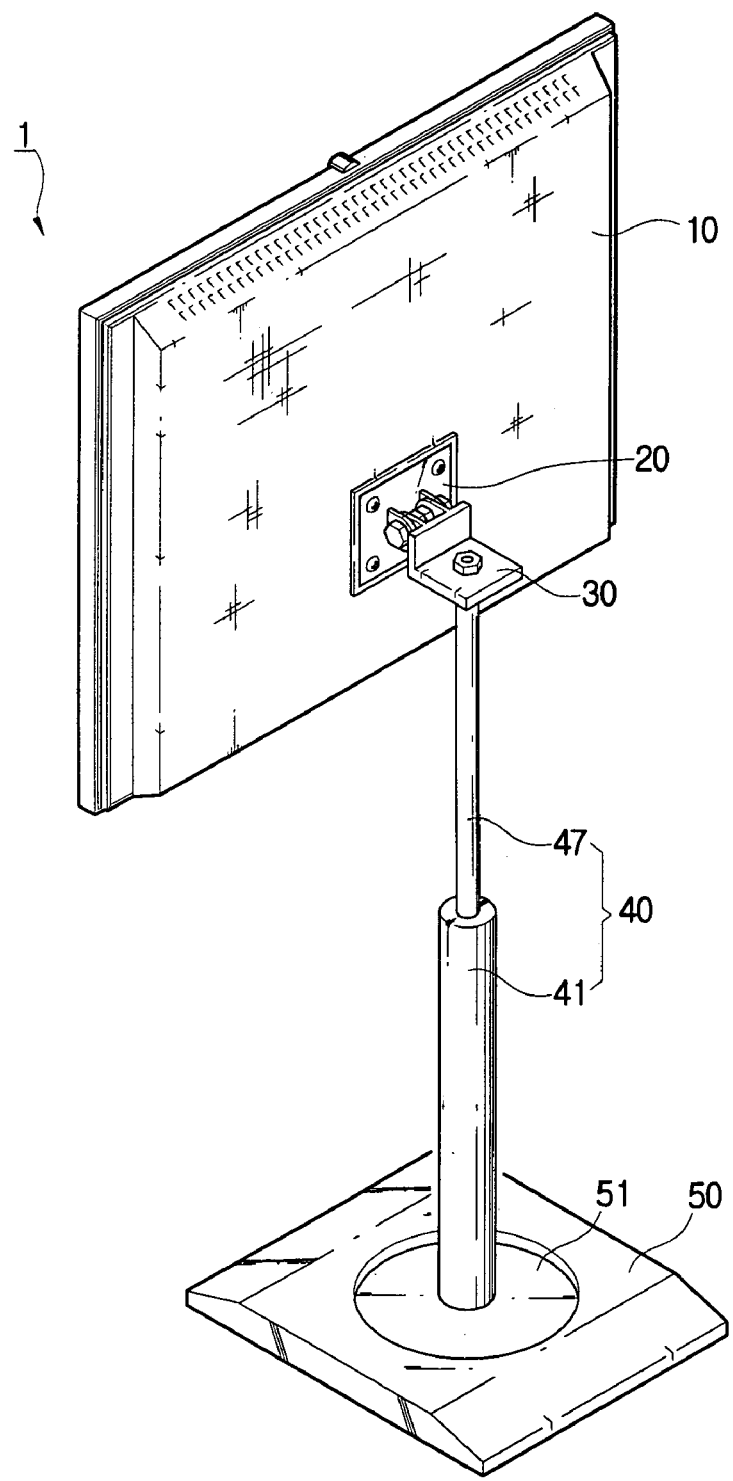
FIG. 1 is a rear perspective view of a display apparatus according to a first embodiment of the present invention.
Figure 2:
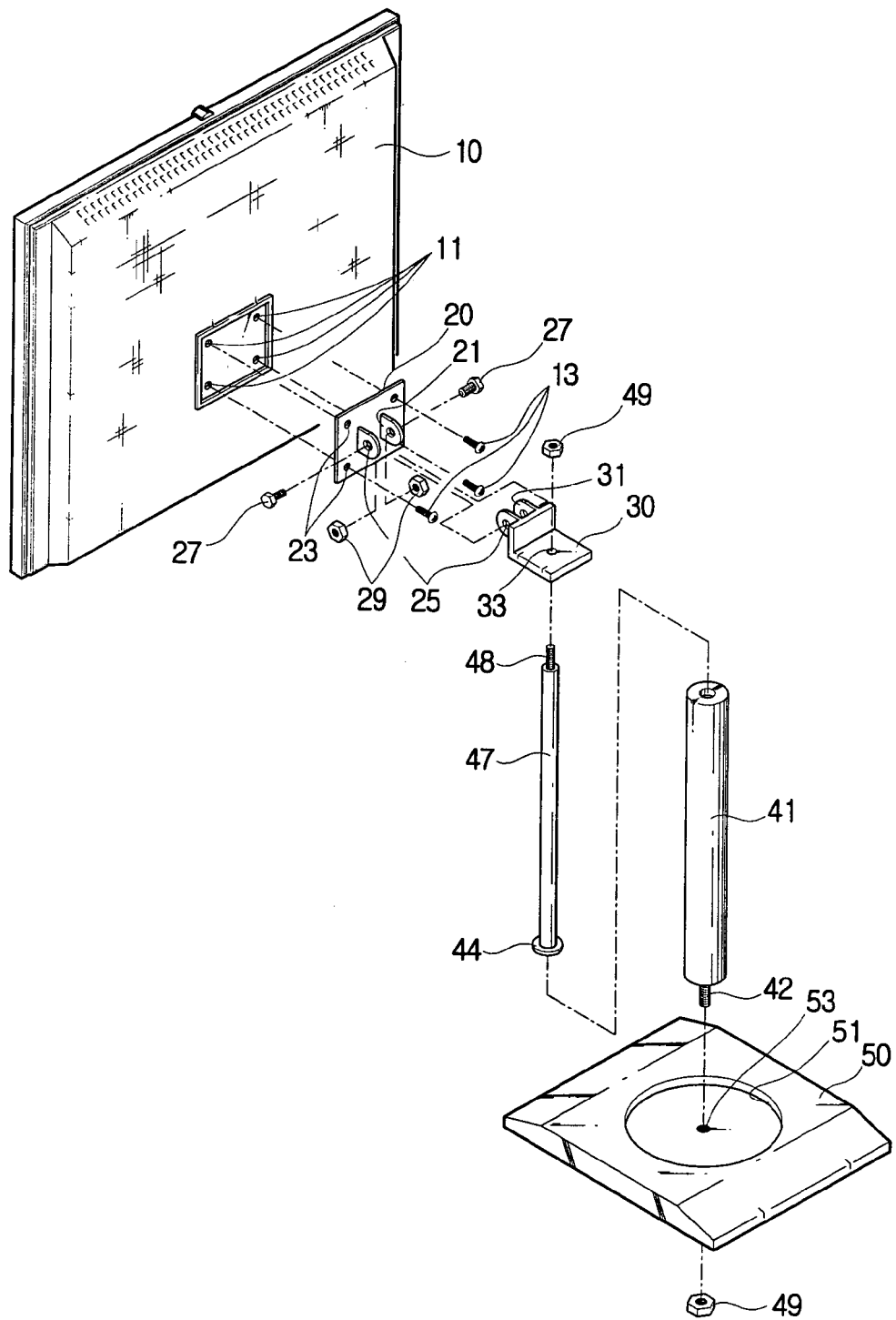
FIG. 2 is an exploded perspective view of the display apparatus of FIG. 1.

Reference will now be made in detail to the embodiments of the present invention, examples of which are illustrated in the accompanying drawings, wherein like reference numerals refer to like elements throughout. The embodiments are described below to explain the present invention by referring to the figures.

As shown in FIGS. 1 through 4, a display apparatus 1 according to a first embodiment of the present invention has: a display main body 10 provided with a screen; a base member 50 which supports the display main body 10 and is laid on a horizontal plane such as a table; a cylinder assembly 40 provided between the display main body 10 and the base member 50 to liftably support the display main body 10; a cylinder bracket 30 provided between the display main body 10 and the cylinder assembly 40 to be combined with the cylinder assembly 40; and a display bracket 20 which is provided between a rear of the display main body 10 and the cylinder bracket 30 and is combined with them, respectively, so that the display main body 10 is tiltable relative to the cylinder main body 10.

The display main body 10 is provided with a screen made of an LCD panel at a front thereof and a plurality of main body combining holes 11 combined with the display bracket 20 with screws 13 at a rear thereof. These main body combining holes 11 are positioned according to the standard of VESA (Video Electronic Standard Association), and can be employed with a variety of arm stands.

According to one aspect, the display bracket 20 is a plate and has: a plurality of bracket combining holes 23 positioned corresponding to the main body combining holes 11 of the display main body 10, and a pair of first tilting brackets 21 protruding from the surface of the display bracket 20 in a direction opposite to a direction of attaching the display bracket 20 to the display main body 10.

The pair of first tilting brackets 21 has a pair of bolt inserting holes 25, and is connected with second tilting brackets 31 of the cylinder brackets 30 (to be described later), so that the display main body 10 is tiltable relative to the cylinder bracket 30.

The cylinder bracket 30 is "L" shaped and comprises the pair of second tilting brackets 31, which protrude from a vertical surface of the cylinder bracket 30 toward the display bracket 20, to connect with the first tilting brackets 21. And on a horizontal surface of the cylinder bracket 30, there is a cylinder combining hole 33 to combine with a cylinder rod 47 of the cylinder assembly 40.

The pair of second tilting brackets 31 also has a pair of bolt inserting holes 25. A pair of tilting bolts 27 is inserted in the pair of bolt inserting holes 25 of the first and second tilting brackets 21 and 31, respectively, and combined with tilting nuts 29, thereby creating a binding force of a predetermined magnitude. This binding force generates a friction as the display main body 10 is tilted relative to the cylinder bracket 30. Thus, a user must exert a predetermined pressure on the display main body 10 to tilt the display main body 10.

The cylinder assembly 40 is combined with the base member 50 and has: a cylinder 41 filled with gas in a pressurized inside thereof; a piston 44 slidably provided in the cylinder 41; and the cylinder rod 47 that extends and retracts from the cylinder 41, with a bottom that is combined to an upper surface of the piston 44 and a top that is combined with the cylinder bracket 30, respectively.

The cylinder 41 is provided with a cylinder bolt 42 that is inserted through a combining hole 53 of the base member 50 (to be described later) and combined with a nut 49.

The piston 44 slidably provided inside of the cylinder 41 has a plurality of through holes 45 of diminutive size pierced in a direction of sliding.

The through holes 45 are employed to maintain a uniform pressure by passing the divided gas therethrough, as the piston 44 slides up and down inside of the cylinder 41.

The cylinder rod 47 includes a rod bolt 48 with a bottom connected to an upper surface of the piston 44 and a top that is inserted through the cylinder combining hole 33 of the cylinder bracket 30 and combined with another nut 49.

With this configuration, the cylinder assembly 40 is operated as follows: the pressure of the gas divided by the piston 44 in the cylinder 41 is maintained uniformly due to the through holes 45. But the areas where upper and lower surfaces of the piston 44 and the gas are in contact are different from each other, because the cylinder rod 47 is mounted on the upper surface of the piston 44. The area where the lower surface of the piston 44 and the gas contact is broader, thus an upward force is applied to the piston 44. The upward force applied to the piston 44 (called a "supporting force" in this specification) is used to vary a height of the display main body 10.

If the supporting force is balanced with the weight of the display main body 10, then the display main body 10 remains in place once it is positioned. If a user applies force to the display main body 10 upwardly or downwardly to vary a height thereof, the cylinder rod 47 in the cylinder 41 accordingly slides upwardly or downwardly varying the height of the display main body 10. Further, if the force from the user is eliminated, the display main body 10 stops moving at that point.

Further, according to one aspect, the cylinder assembly 40 has a greater supporting force than the weight of the display main body 10. The difference between the two forces may be sufficiently small, however, that the display main body 10 does not move upwardly because of the static friction between an inner wall of the cylinder 41 and a circumference of the piston 44. In this case, the height of the display main body 10 can be varied with greater ease.

The base member 50 has a combining part 51 recessed in an upper surface thereof to simplify combining the base member 50 with the cylinder 41 of the cylinder assembly 40. The base member 50 also has a combining hole 53 through which the cylinder bolt 42 of the cylinder 41 is inserted and then combined with the nut 49.

With this configuration, the display apparatus 1 according to the first embodiment of the present invention is operated as follows: the display bracket 20 connected to the display main body 20 is tiltably combined with the cylinder bracket 30 with a predetermined friction. Thus, the display main body 10 can be tilted relative to the cylinder bracket 30 by a predetermined force applied to the display main body 10 frontward or backward.

Figure 3:
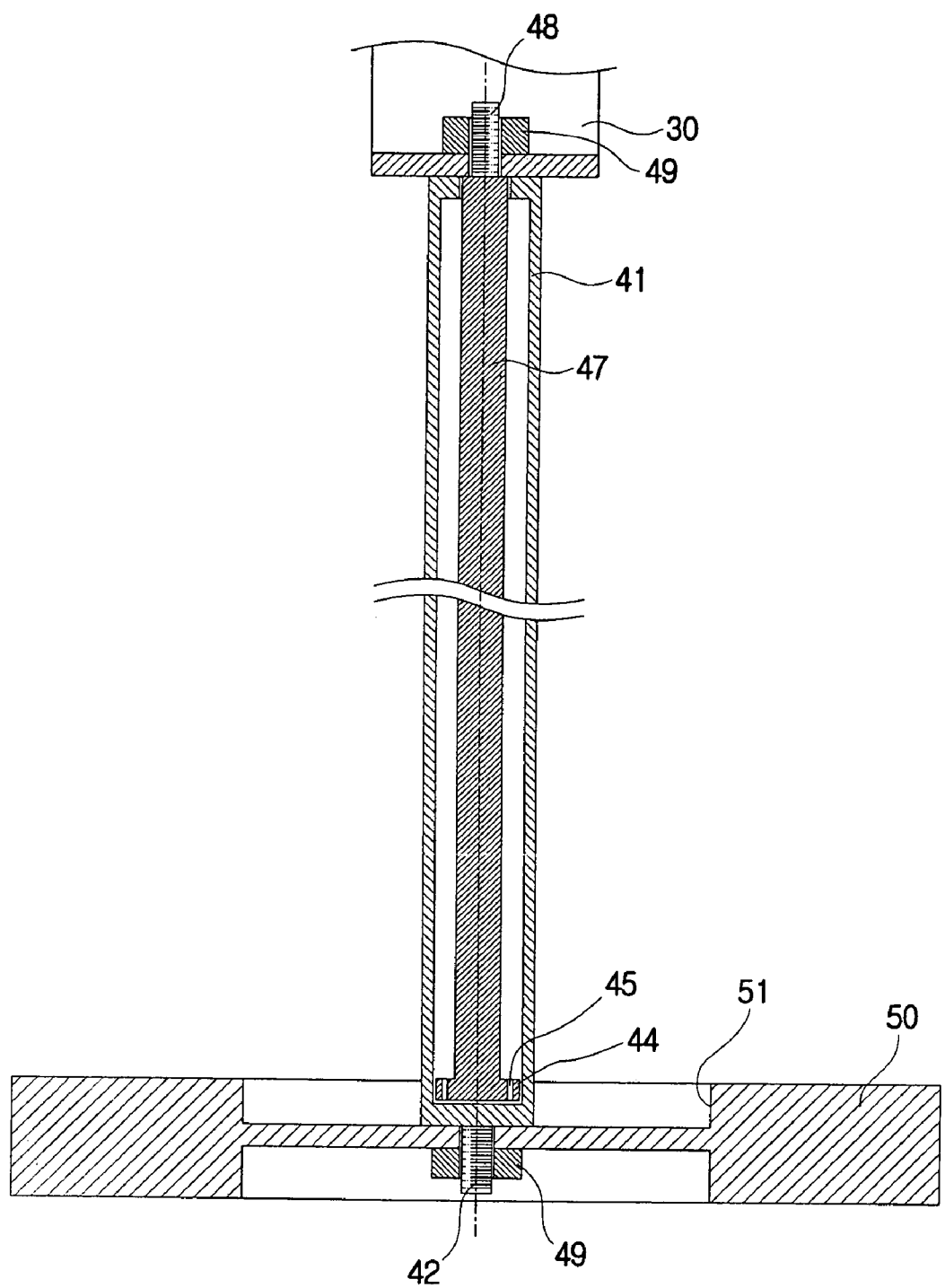
FIGS. 3 and 4 are sectional views showing operation of the display of FIG. 1.
Figure 4:
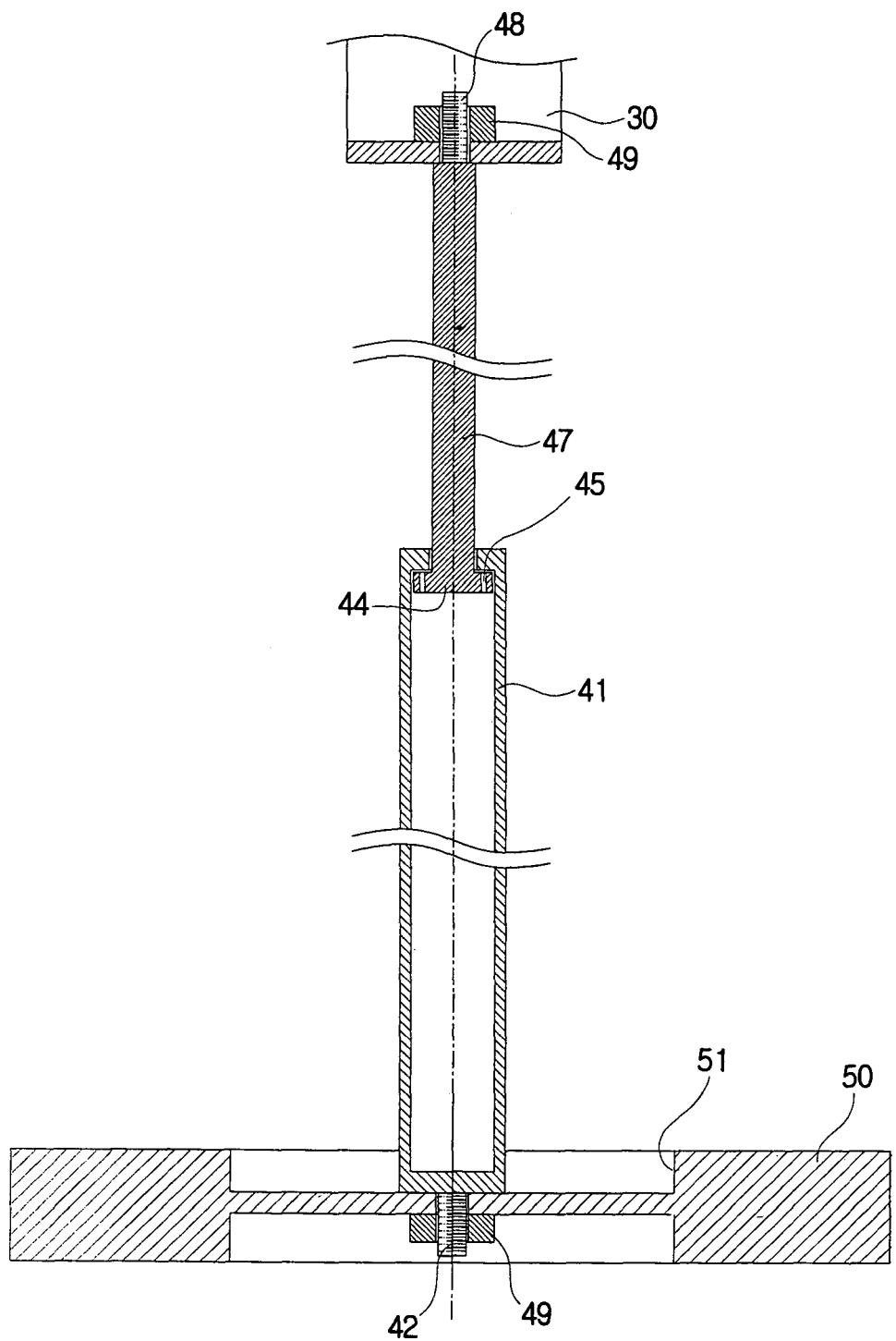

The process of a lifting the display main body 10 is shown in FIGS. 3 and 4. If a user applies a predetermined upward force to the display main body 10 when the display main body 10 is in a lowered position, then the cylinder rod 47 slides upwardly inside of the cylinder 41. Thereafter, if the user ceases applying the force to the display main body 10, the display main body 10 stops moving upwardly at that point. Because the weight of the display main body 10 is supported by the cylinder assembly 40, the user can lift the display main body 19 with only a small effort. The process of moving the display main body 10 down is the reverse of the process of moving it up.

The user can vary the height of the display main body 10 with ease, and can make fine adjustments. As described above, according to one aspect, the supporting force of the cylinder assembly 40 is greater than the weight of the display main body 10. In this case, the user can move the display main body 10 with greater ease.

Figure 5:
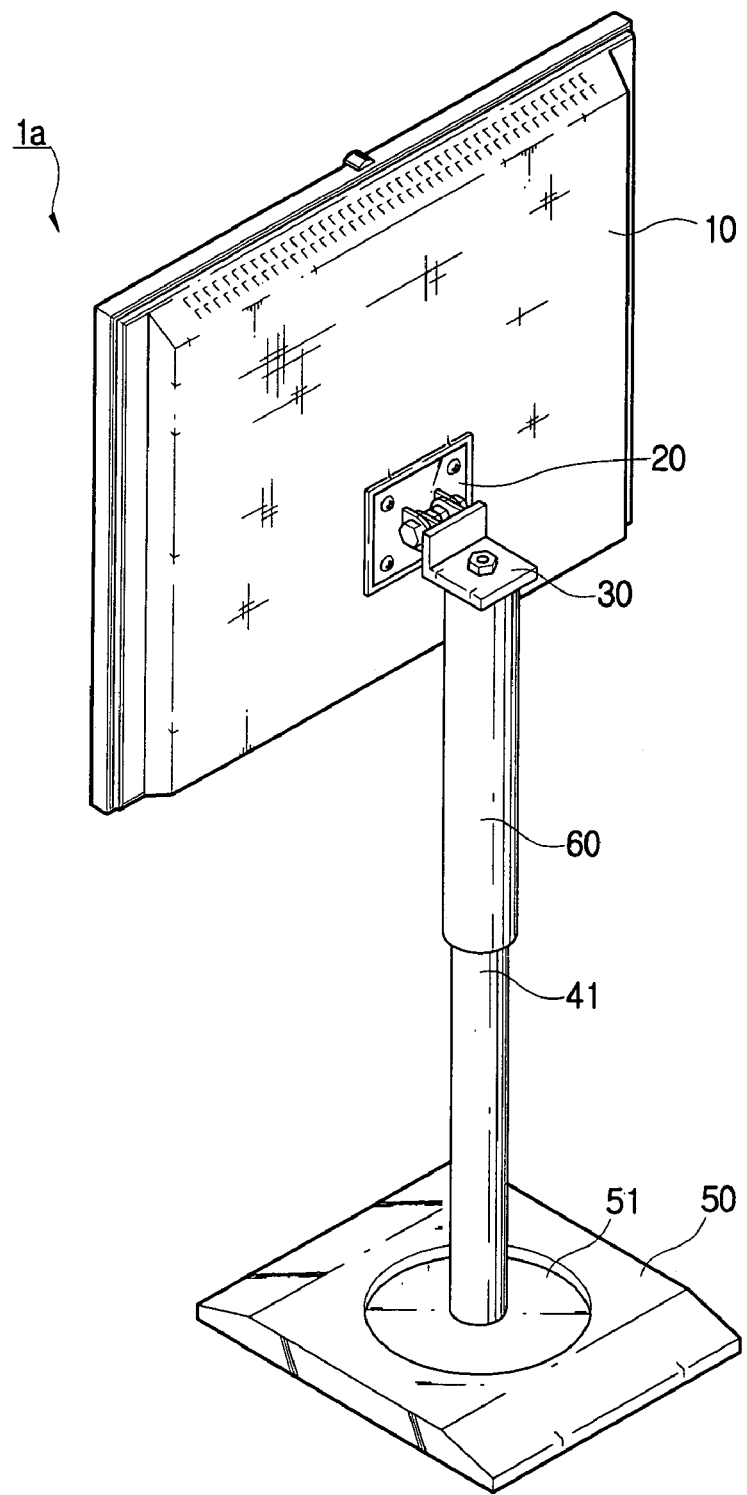
FIG. 5 is a rear perspective view of a display apparatus according to a second embodiment of the present invention.
Figure 6:
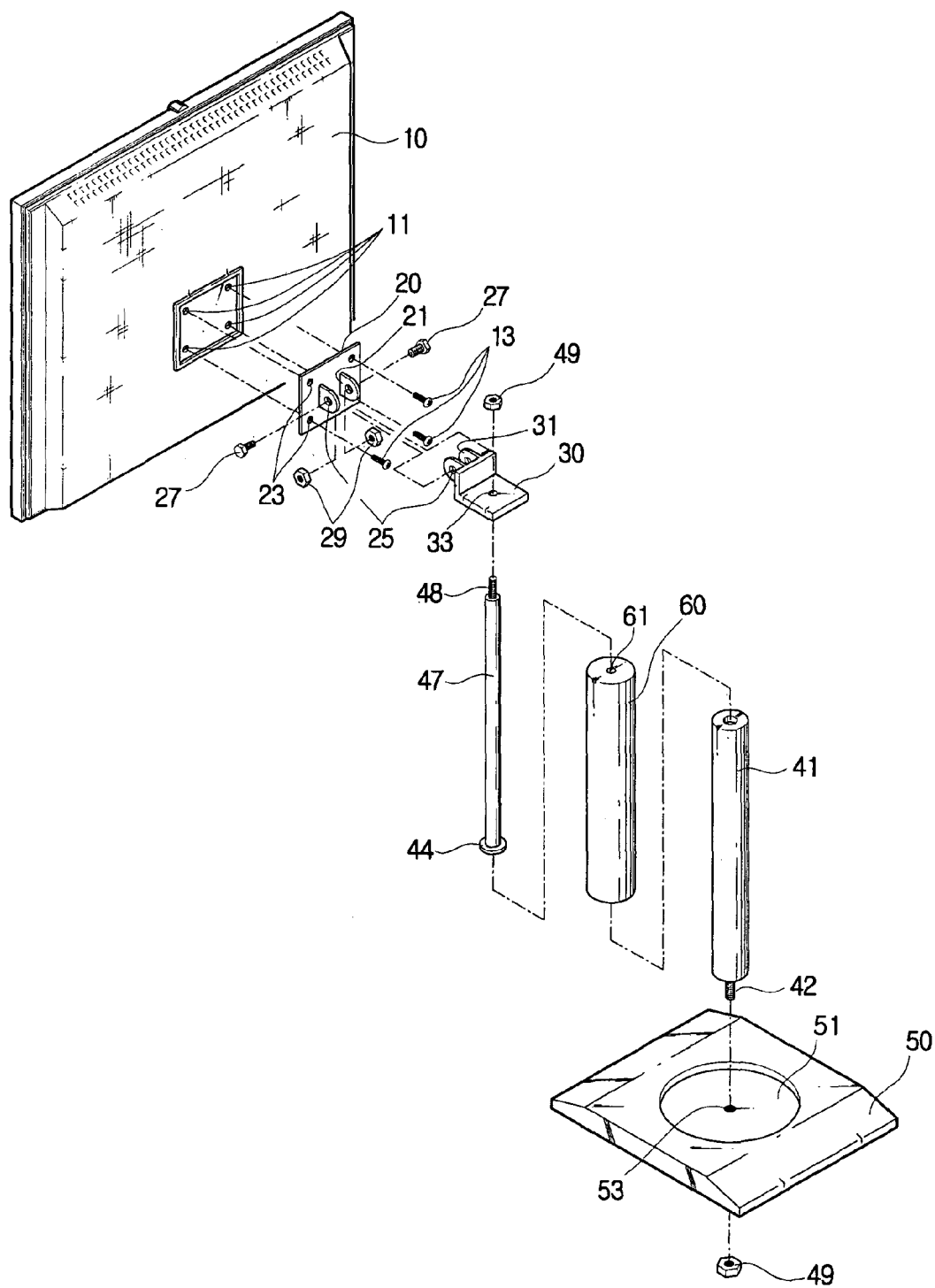
FIG. 6 is an exploded perspective view of the display apparatus of FIG. 5.
Figure 7:
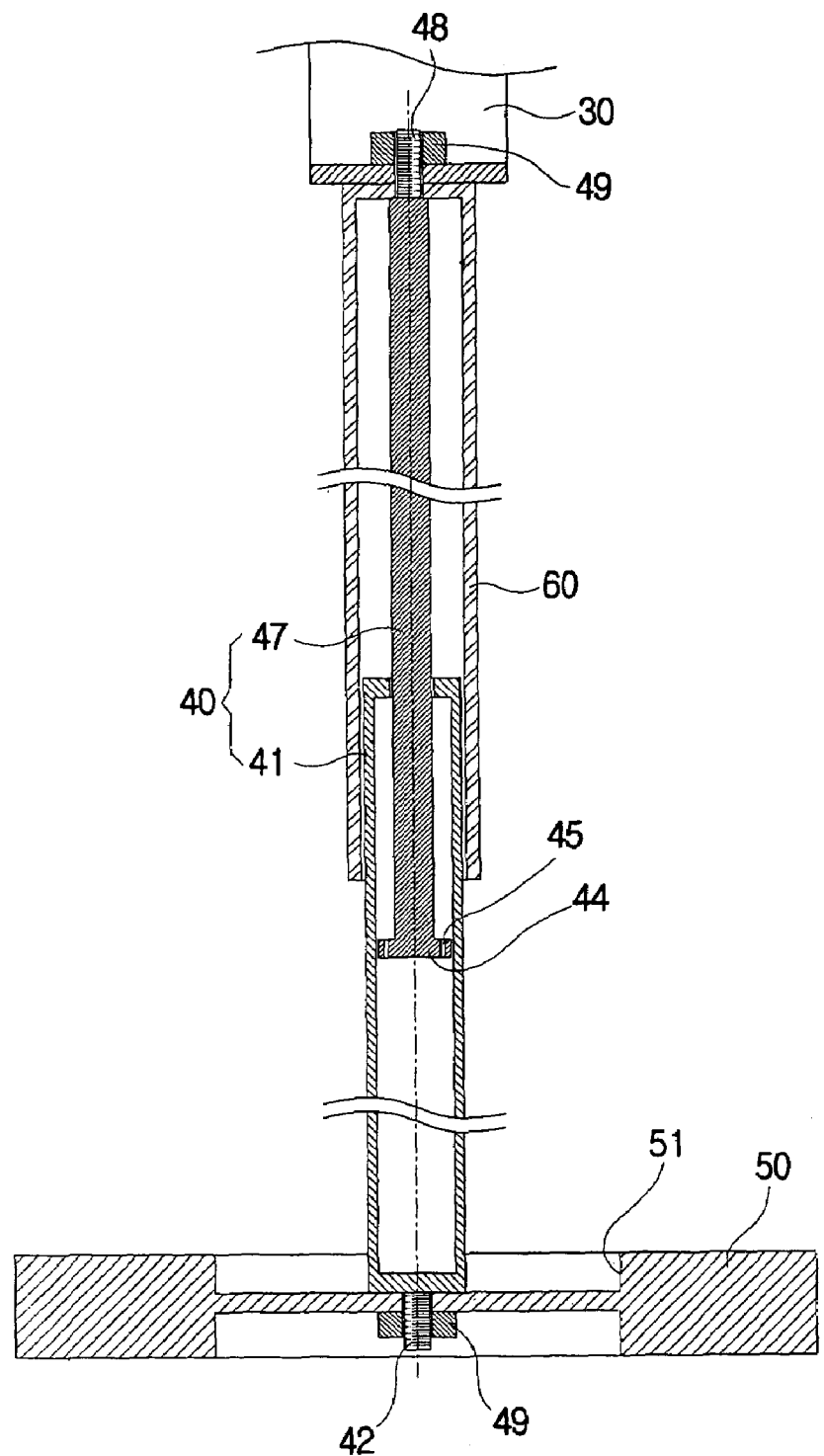
FIG. 7 is a sectional view showing operation of the display apparatus of FIG. 5.

FIGS. 5 and 6 are perspective views of the display apparatus according to a second embodiment of the present invention, and FIG. 7 is a sectional view thereof. As shown in these drawings, the display apparatus 1a of the second embodiment, as compared to the first embodiment, further comprises a rod supporter 60 with a top combined with an upper end part of the cylinder rod 47 and a bottom slidably contacting a circumference of the cylinder 41. The cylinder rod 47 and the rod supporter 60 are lifted as a single body.

The rod supporter 60 is generally pipe shaped and at a top thereof has a rod combining hole 61 with a diameter large enough that the rod bolt 48 of the cylinder rod 47 can be inserted therethrough, but smaller than the diameter of the cylinder rod 47. A bottom of the rod supporter 60 is hollowed to slidably inserte the cylinder 41 therein.

The rod supporter 60 is lifted as a single body with the cylinder rod 47 when the display main body 10 is lifted. The rod supporter 60 supports the cylinder rod 47, thereby preventing the display main body 10 from being shaken and the cylinder rod 47 from being bent. The second embodiment may offer a safer and stronger structure than the first embodiment.

Figure 8:
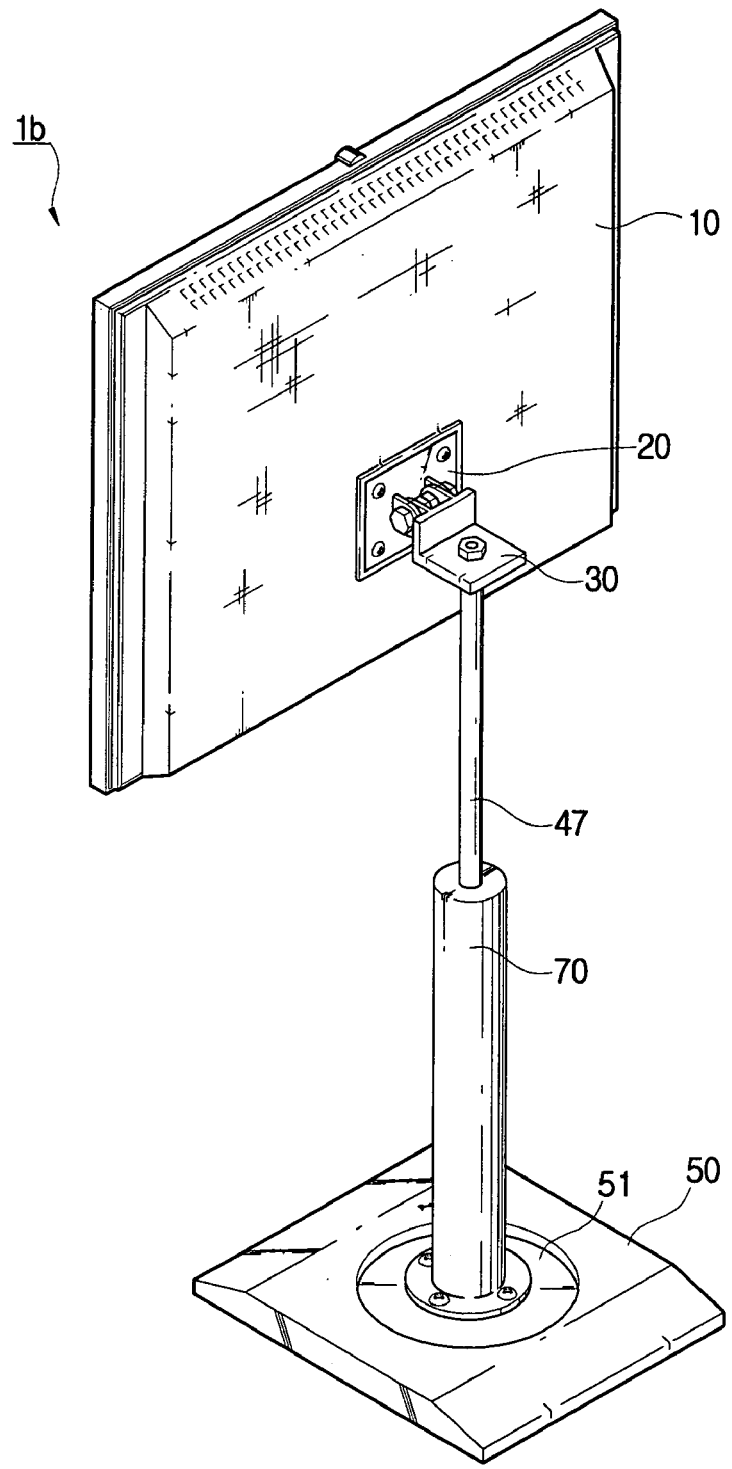
FIG. 8 is a rear perspective view of a display apparatus according to a third embodiment of the present invention.
Figure 9:
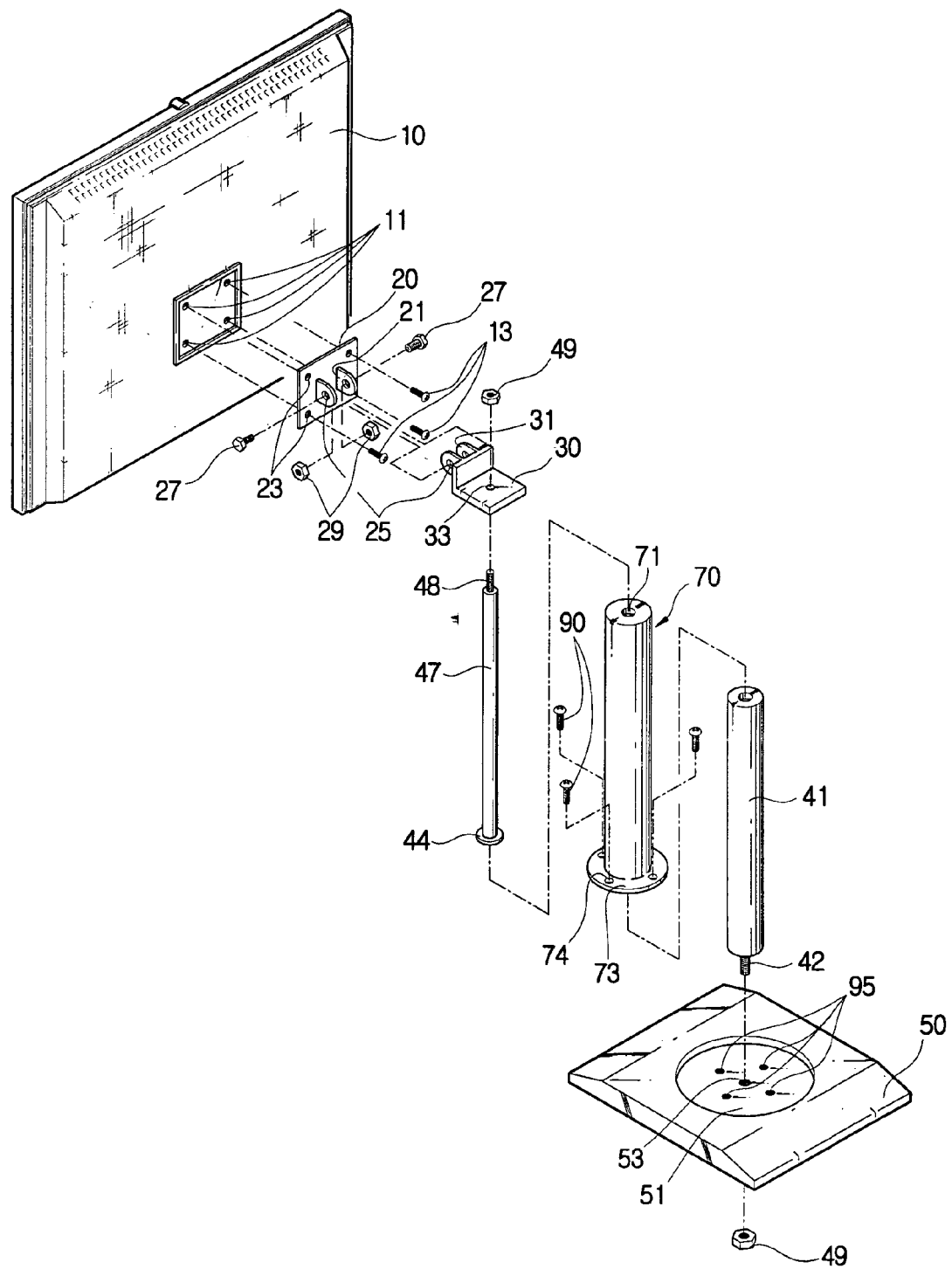
FIG. 9 is an exploded perspective view of the display apparatus of FIG. 8.
Figure 10:
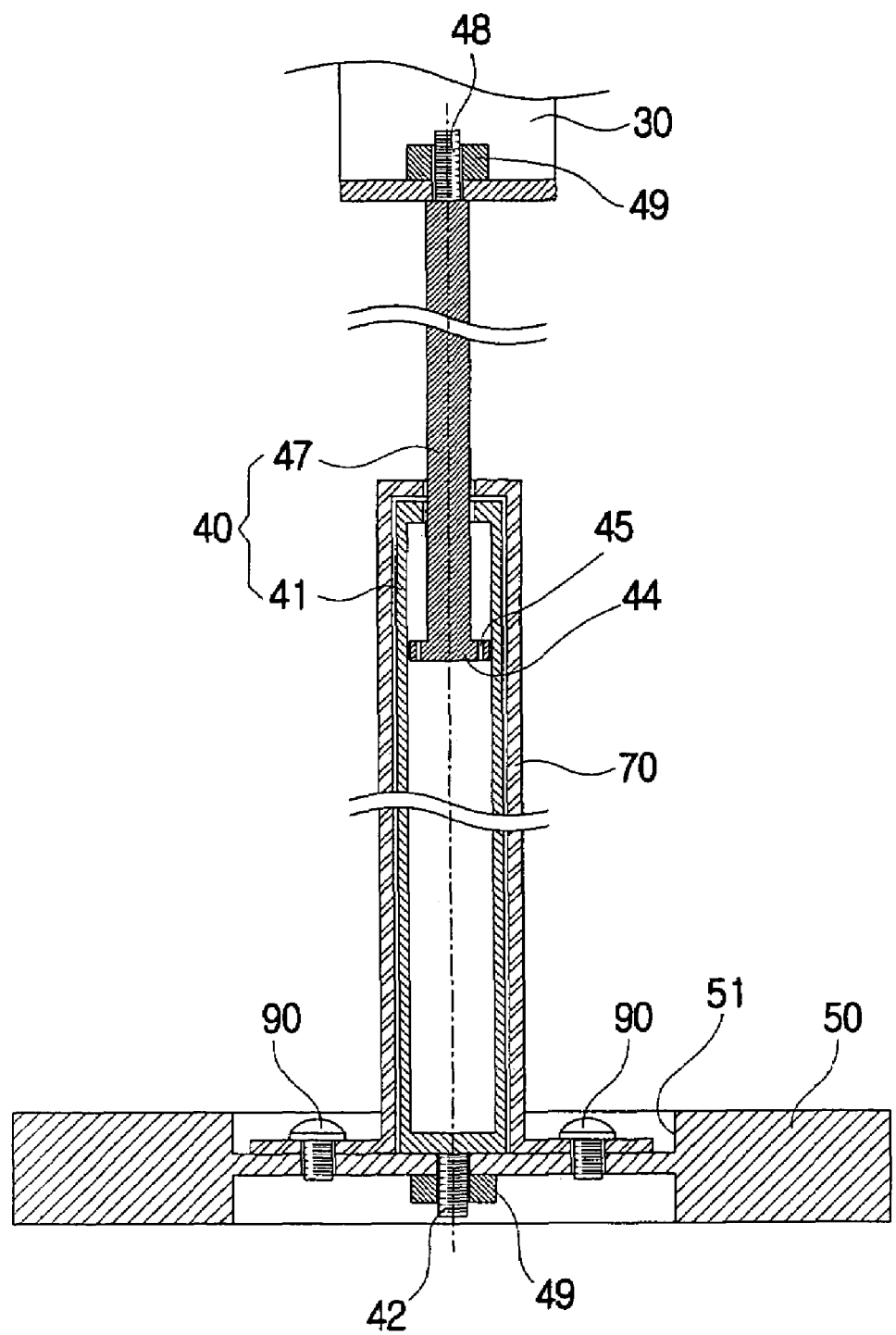
FIG. 10 is a sectional view showing operation of the display of FIG. 8.

FIGS. 8 and 9 are perspective views of the display apparatus according to a third embodiment, and FIG. 10 is a sectional view thereof. As shown in these drawings, the display apparatus 1b according to the third embodiment, compared to the first embodiment, further comprises a cylinder supporter 70 with a top end contacting a top of the cylinder 41, and a bottom end thereof combined with the base member 50 to accommodate and support the cylinder 41.

The cylinder supporter 70 is generally pipe shaped. At a top of the cylinder supporter 70, there is provided a cylinder combining hole 71 with a diameter large enough that the cylinder rod 47 can be inserted therein, but smaller than the diameter of the cylinder 41. At a bottom of the cylinder supporter 70, there is provided a cylinder bracket 73 on which a plurality of supporter combining holes 74 are positioned to combine the cylinder supporter 70 with the base member 50. In the base member 50, combining holes 95 are positioned corresponding to the supporter connecting holes 74, to combine the cylinder supporter 70 and the base member 50 with screws 90.

Here, the cylinder supporter 70 supports the cylinder 40, thereby preventing the display 1b from being shaken; this third embodiment may offer a safer and stronger lifting structure than the first and second embodiments.

Figure 11:
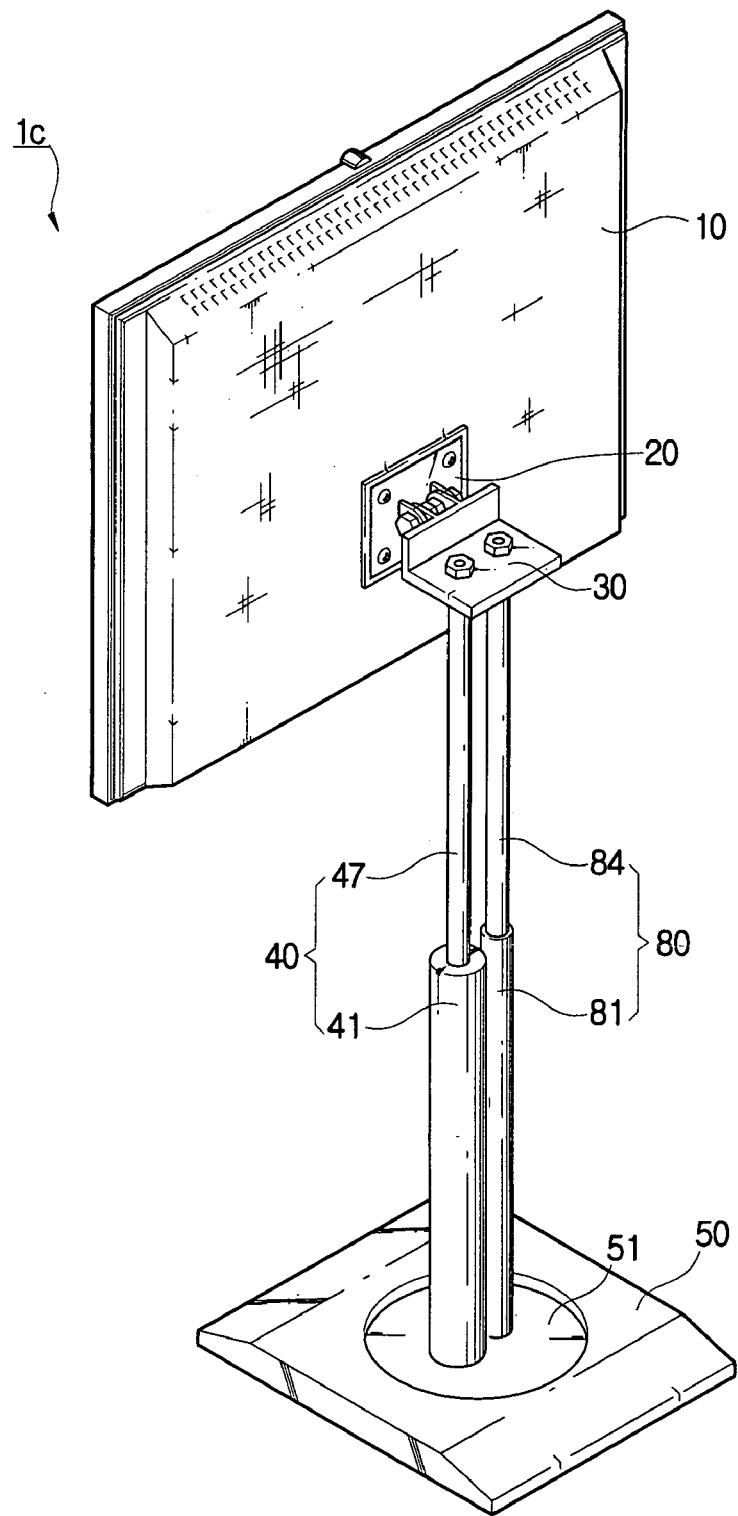
FIG. 11 is a rear perspective view of a display apparatus according to a fourth embodiment of the present invention.
Figure 12:
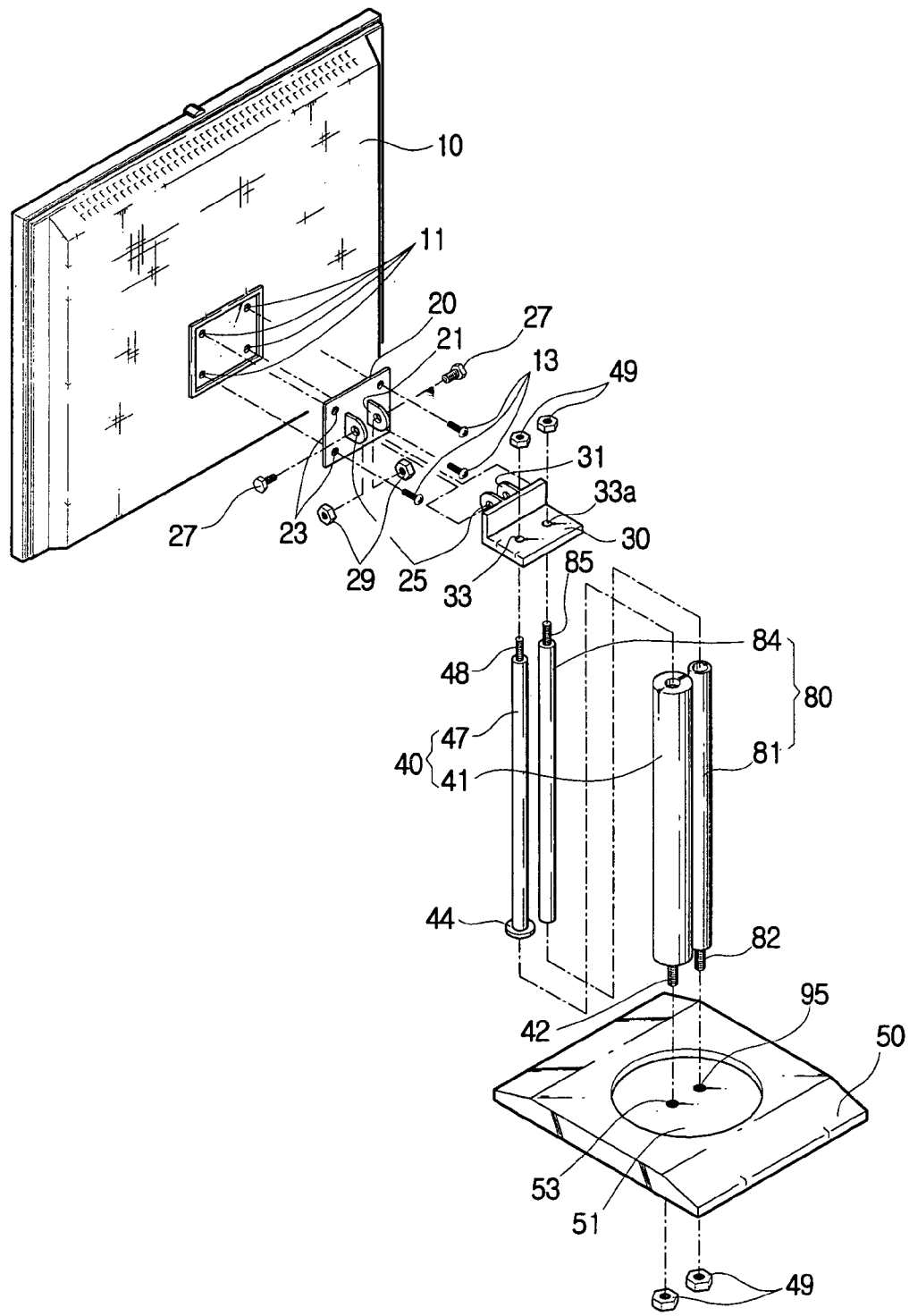
FIG. 12 is an exploded perspective view of the display apparatus of FIG. 11.
Figure 13:
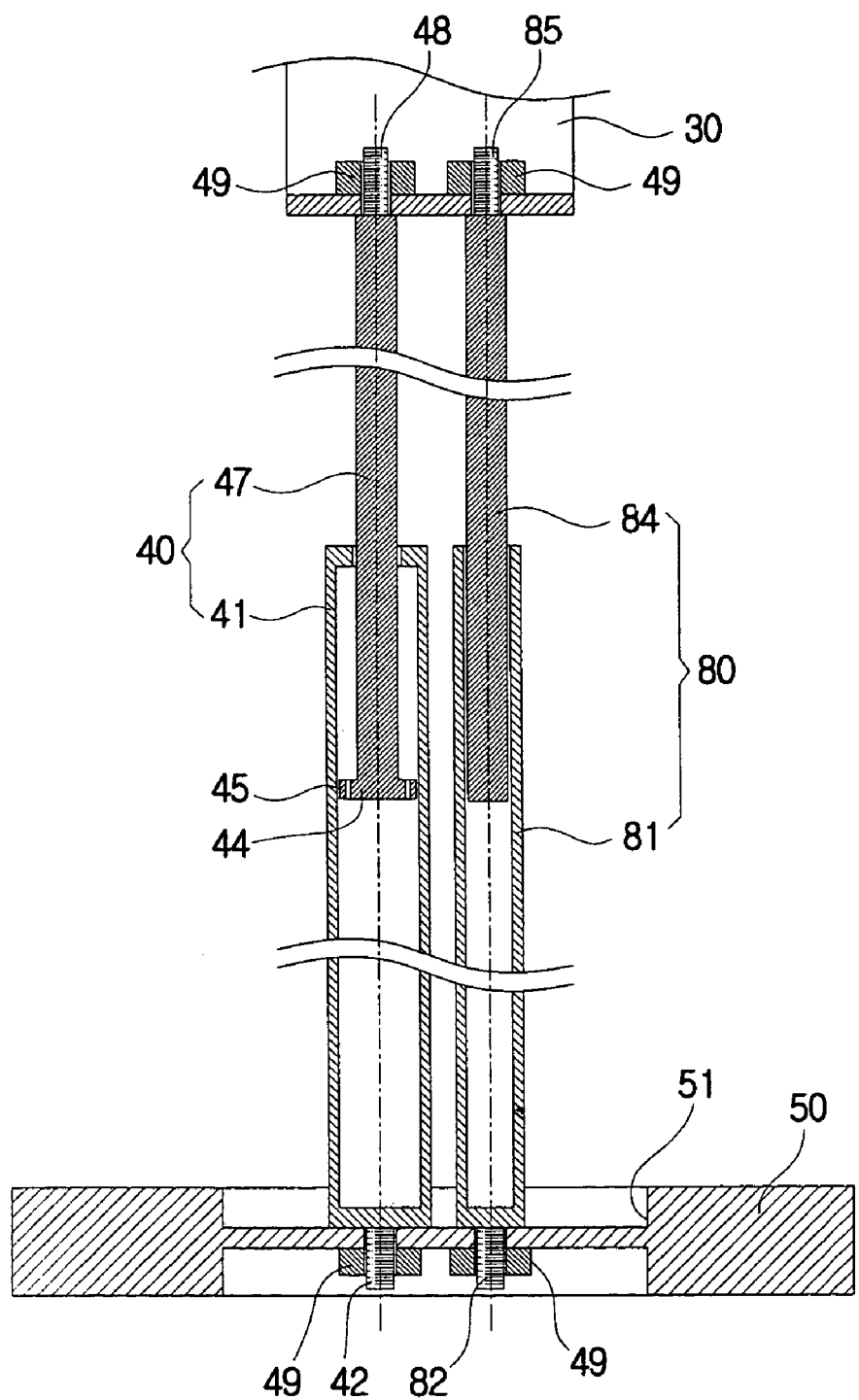
FIG. 13 is a sectional view showing operation of the display of FIG. 11.

FIGS. 11 and 12 are perspective views of the display apparatus according to a fourth embodiment of the present invention, and FIG. 13 is a sectional view thereof. Compared to the first embodiment, as shown in these drawings, the display apparatus 1c according to the fourth embodiment further comprises an auxiliary cylinder assembly 80 placed between the display main body 10 and the base member 50 to support the lift of the display main body 10.

According to one aspect, the auxiliary cylinder assembly 80 is provided adjacent to the cylinder assembly 40, and has a hollow guide pipe 81 combined with the base member 50, and a guide rod 84 slidably inserted in the guide pipe 81.

The hollow guide pipe 81 is provided at a bottom with a pipe bolt 82 combined with the base member 50. On the base member 50, there is an additional combining hole 95, through which the of the pipe bolt 82 of the hollow guide pipe 81 is inserted and combined with the nut 49.

The guide rod 84 is provided at a top with a guide bolt 85 to be combined with the cylinder bracket 30. At the horizontal surface of the cylinder bracket 30, there is an additional cylinder combining hole 33a, through which the guide bolt 85 of the guide rod 84 is inserted and combined with the nut 49.

The guide rod 84 of the auxiliary cylinder assembly 80 slides out of the guide pipe 81, as the display main body 10 is lifted and supports the display main body 10 together with the cylinder rod 47, thereby preventing the display main body 10 from being shaken and the cylinder rod 47 from being bent. In the above-described embodiment, only one auxiliary cylinder assembly 80 is provided, but it is natural that a plurality of auxiliary cylinder assemblies 80 may be provided as necessary. This fourth embodiment may offer a safer and stronger lifting structure than the first embodiment.

Figure 14:
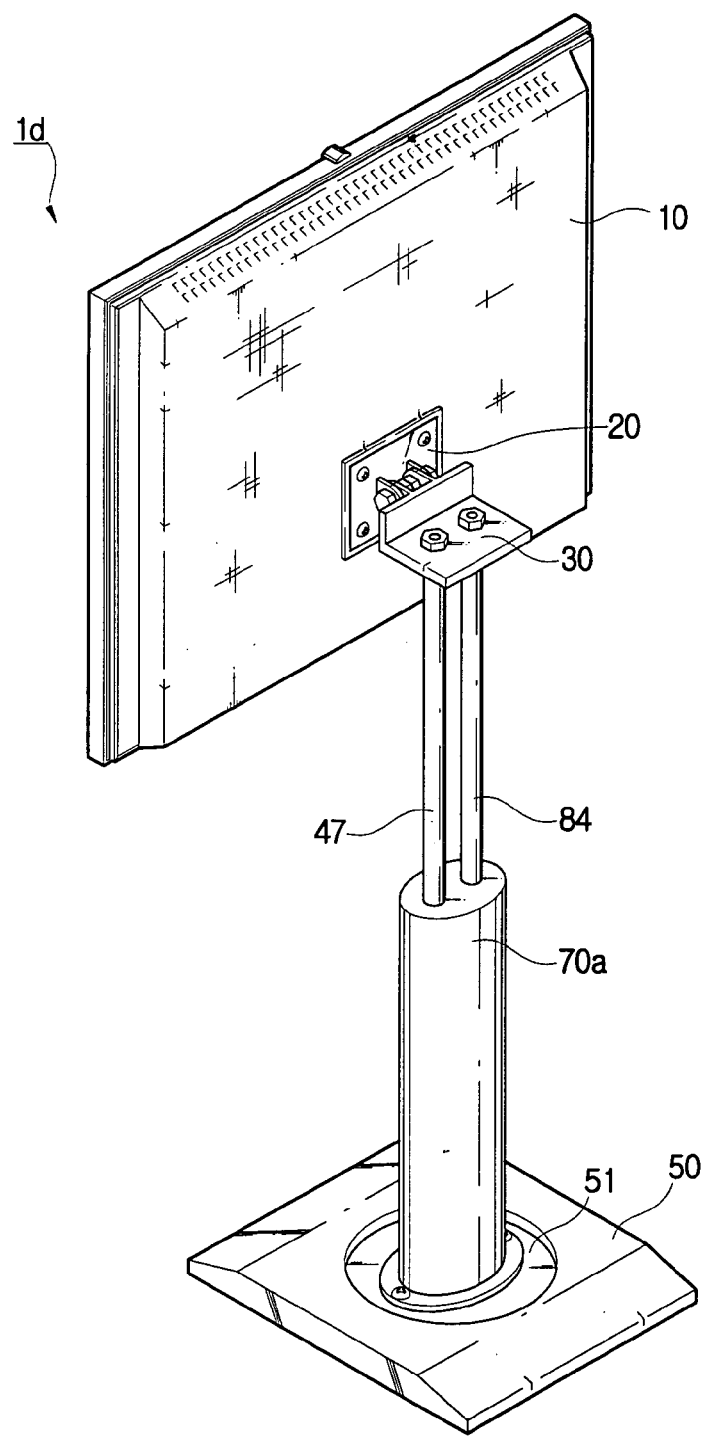
FIG. 14 is a rear perspective view of a display apparatus according to a fifth embodiment of the present invention.
Figure 15:
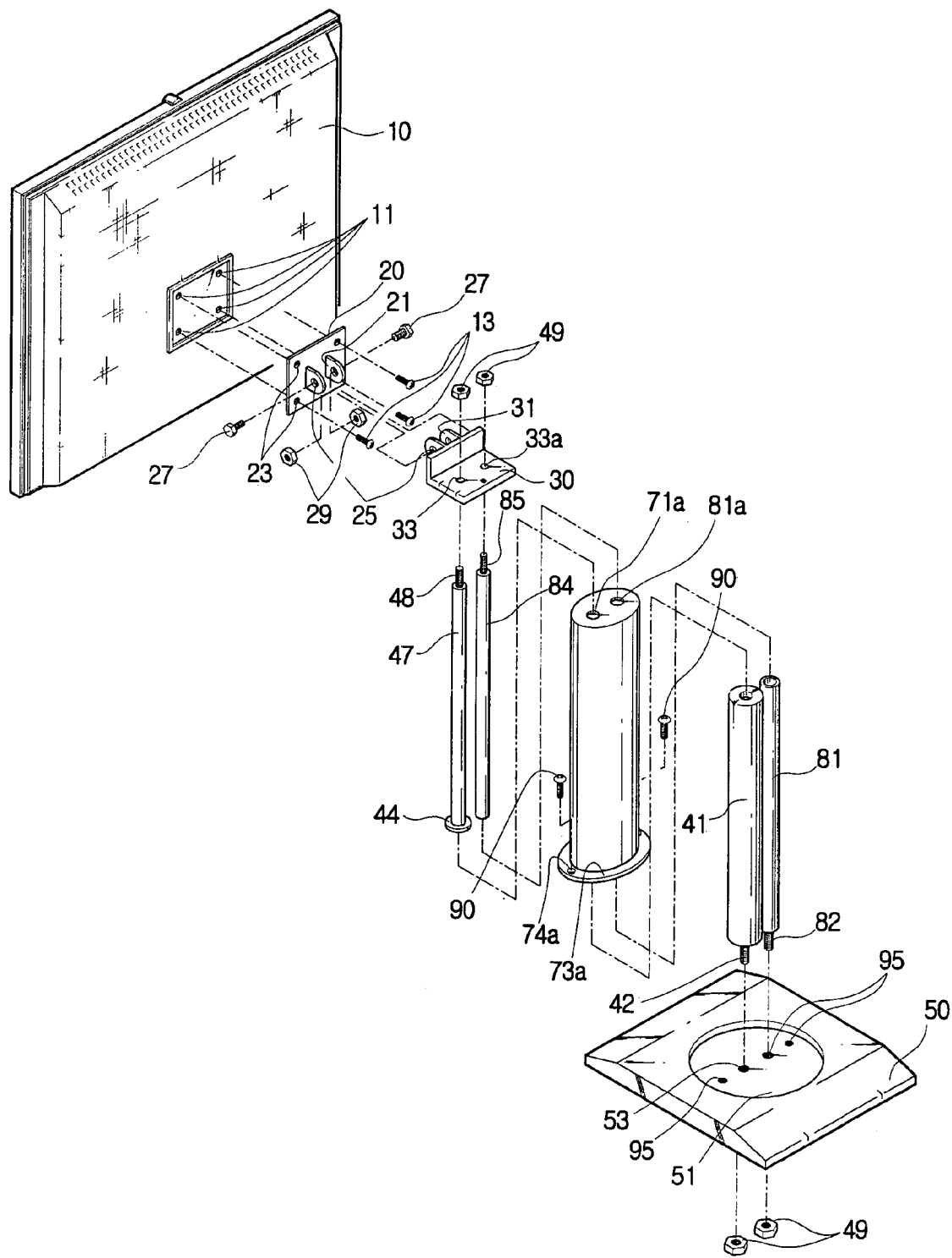
FIG. 15 is an exploded perspective view of the display apparatus of FIG. 14.
Figure 16:
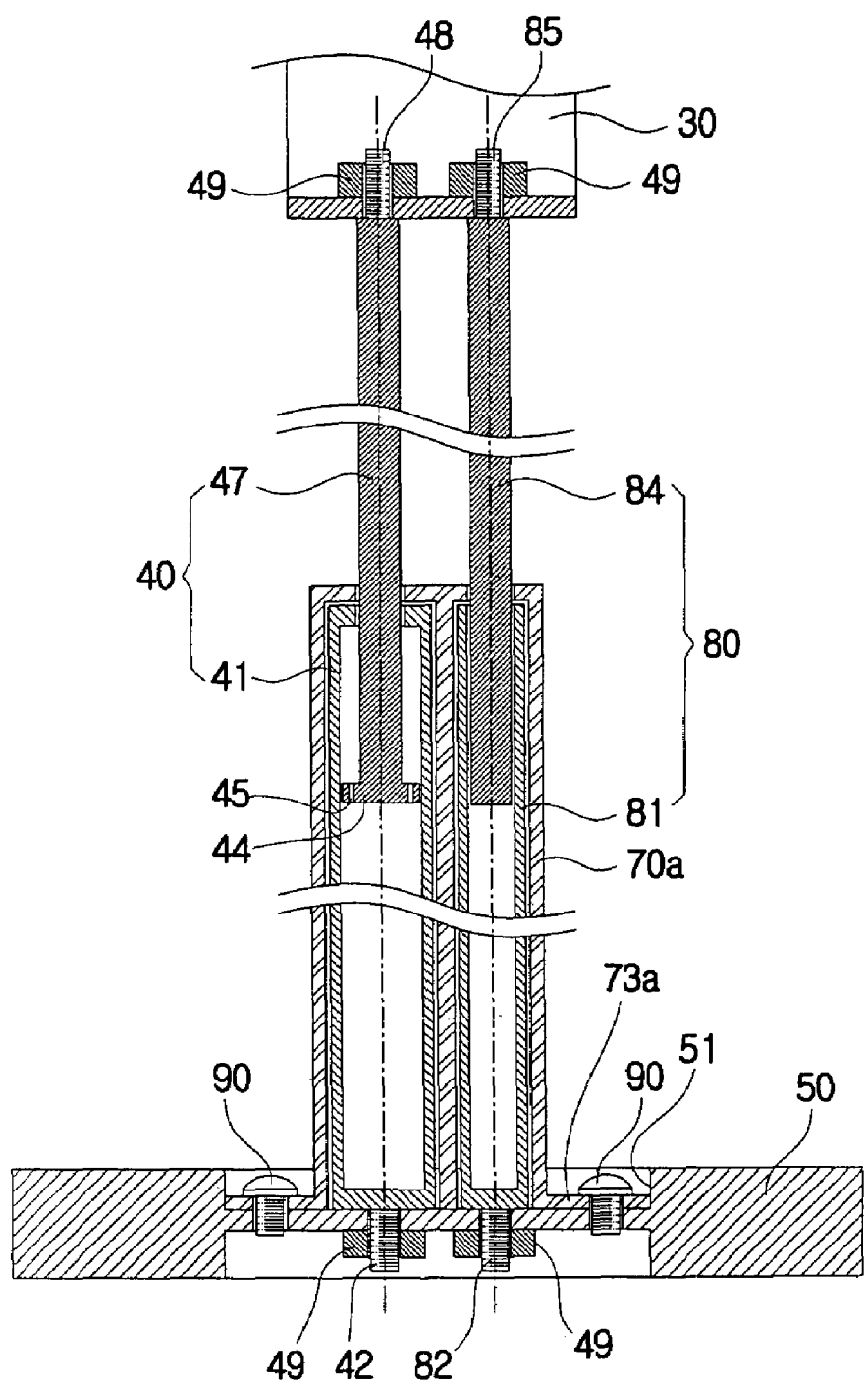
FIG. 16 is a sectional view showing operation of the display apparatus of FIG. 14.

FIGS. 14 and 15 are perspective views of the display apparatus according to a fifth embodiment of the present invention, and FIG. 16 is a sectional view thereof. Compared to the fourth embodiment, as shown in these drawings, the display apparatus 1d according to the fifth embodiment further comprises a cylinder supporter 70a with a bottom combined with the base member 50, and a top accommodating and supporting the cylinder 41 and the guide pipe 81.

The top of the cylinder supporter 70a has: a cylinder combining hole 71a with a diameter is large enough that the cylinder rod 47 can be inserted therein, but smaller than the diameter of the cylinder 41; and a pipe combining hole 81a, with a diameter large enough that the guide rod 84 can be inserted therein, but smaller than the diameter of the hollow guide pipe 81. At the bottom of the cylinder supporter 70a, is a supporter bracket 73a combined with the base member 50. On the base member 50 are combining holes 95 corresponding to supporter combining holes 74a of the supporter bracket 73a. The cylinder supporter 70a is combined with the base member 50 via the supporter combining holes 74a and the combining holes 95 using screws 90.

Here, the cylinder supporter 70a supports the cylinder 41 and the guide pipe 81, thereby preventing the display main body from being shaken; this fifth embodiment may offer a safer and stronger lifting structure than at least one of the above-described four embodiments.

In the display apparatuses according to the above-described embodiments, the display main body is only to be tilted relative to the cylinder bracket. According to one aspect, however, the display main body is pivoted, i.e., rotated within a predetermined angle about the axis formed from the center of the display main body to the forward and backward direction. Further, according to another aspect, the display main body is swiveled, i.e., rotated within a predetermined angle along the vertical axis from the base member to the display main body.

As described above, embodiments of the present invention offer the display apparatus with a simple structure that is capable of fine variations of the height of the display main body. Further, the display main body can be lifted easily with a small force.

According to various aspects, the rod supporter, the cylinder supporter, and the auxiliary cylinder assembly are provided separately, or combined one another, so that the display main body is supported with added safety.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A display apparatus comprising:
    a display main body provided with a screen;
    a base member supporting the display main body;
    a cylinder assembly, provided between the display main body and the base member to liftably support the display main body, and comprising
        a pressurized cylinder combined with the base member,
        a piston slidably provided in the cylinder, and
        a cylinder rod with a bottom combined with an upper surface of the piston and a top combined with the display main body; and
    a rod supporter, with a top combined with an upper end part of the cylinder rod and a bottom contacting a circumference of the cylinder, to be lifted as a single body with the cylinder rod,
    the cylinder assembly exerting a supporting force which is at least as great as a weight of the display main body.

2. A display apparatus comprising:
    a display main body provided with a screen;
    a base member supporting the display main body;
    a cylinder assembly provided between the display main body and the base member to liftably support the display main body, the cylinder assembly exerting a supporting force which is at least as great as a weight of the display main body, wherein the cylinder assembly comprises
        a pressurized cylinder combined with the base member,
        a piston slidably provided in the cylinder,
        a cylinder rod with a bottom combined with an upper surface of the piston and a top combined with the display main body; and
    a cylinder supporter combined with the base member to accommodate and support the cylinder.

3. A display apparatus comprising:
    a display main body provided with a screen;
    a base member supporting the display main body;
    a cylinder assembly provided between the display main body and the base member to liftably support the display main body, the cylinder assembly exerting a supporting force which is at least as great as a weight of the display main body, wherein the cylinder assembly comprises
        a pressurized cylinder combined with the base member,
        a piston slidably provided in the cylinder,
        a cylinder rod with a bottom combined with an upper surface of the piston and a top combined with the display main body; and
    at least one auxiliary cylinder assembly provided between the display main body and the base member.

4. The display apparatus according to claim 3, wherein the at least one auxiliary cylinder assembly comprises:
    a hollow guide pipe combined with the base member; and
    a guide rod slidably provided in the guide pipe.

5. A display apparatus comprising:
    a display main body provided with a screen;
    a base member supporting the display main body; and
    a cylinder assembly, provided between the display main body and the base member to liftably support the display main body, and comprising
        a pressurized cylinder combined with the base member,
        a piston slidably provided in the cylinder, and
        a cylinder rod with a bottom combined with an upper surface of the piston and a top combined with the display main body;
    at least one auxiliary cylinder assembly provided between the display main body and the base member, and comprising
        a hollow guide pipe combined with the base member, and
        a guide rod slidably provided in the guide pipe; and
    a cylinder supporter combined with the base member to accommodate and support the cylinder and the guide pipe,
    the cylinder assembly exerting a supporting force which is at least as great as a weight of the display main body.

6. The display apparatus according to claim 1, further comprising
    a cylinder bracket provided between the display main body and the cylinder assembly, which is respectively combined with the display main body and the base member.

7. A display apparatus comprising:
    a display main body;
    a base member;
    a cylinder assembly combined to the base member and the display main body, that extends and retracts to vary a distance between the display main body and the base member, the cylinder assembly comprising
        a pressurized cylinder combined to the base member,
        a piston slidably provided in the cylinder, and
        a cylinder rod, combined at a first end to the display main body and combined at a second end to the piston, such that the cylinder rod extends and retracts from the cylinder to vary the distance between the display main body and the base member; and
    a rod supporter, combined at a first end to the first end of the cylinder rod, and having an interior that slidably contacts an exterior of the cylinder.

8. The display apparatus according to claim 7, further comprising:
    a bracket provided between the display main body and the cylinder assembly to tilt the display main body about an axis perpendicular to the cylinder assembly.

9. The display apparatus according to claim 8, wherein the bracket comprises:
    a display bracket combined to the display main body; and
    a cylinder bracket combined to the display bracket and the cylinder assembly.

10. The display apparatus according to claim 9, wherein:
    the display bracket comprises
        a pair of first tilting brackets, each having a bolt inserting hole; and
    the cylinder bracket comprises
        a pair of second tilting brackets, each corresponding to one of the pair of first tilting brackets, and each having a bolt inserting hole,
    wherein a pair of tilting bolts are respectively inserted through the bolt inserting holes of the corresponding first and second tilting brackets, and a pair of tilting nuts, respectively corresponding to the pair of tilting bolts, are combined to the pair of tilting nuts to movably combine the display bracket and the cylinder bracket with a binding force of predetermined magnitude.

11. The display apparatus according to claim 10, wherein:
the binding force generates a friction of predetermined magnitude between the display bracket and the cylinder bracket, which must be overcome to tilt the display main body.

12. The display apparatus according to claim 7, wherein:
a force to extend the cylinder rod due to pressure on the piston is at least as great as a weight of the display main body.

13. The display apparatus according to claim 7, wherein:
a predetermined force to extend the cylinder rod due to pressure on the piston balances a component of a weight of the display main body.

14. The display apparatus according to claim 7, wherein:
a predetermined force to extend the cylinder rod due to pressure on the piston balances a component of a weight of the display main body such that when no external force is applied to vary the distance between the display main body and the base member, the display main body remains stationary relative to the base member.

15. The display apparatus according to claim 7, wherein:
a predetermined force to extend the cylinder rod due to pressure on the piston exceeds a component of a weight of the display main body to compensate for static friction between an inner wall of the cylinder and a circumference of the piston, such that when no external force is applied to vary the distance between the display main body and the base member, the display main body remains stationary relative to the base member.

16. A display apparatus, comprising:
a display main body;
a base member;
a cylinder assembly combined to the base member and the display main body, that extends and retracts to vary a distance between the display main body and the base member, the cylinder assembly comprising
    a pressurized cylinder combined to the base member,
    a piston slidably provided in the cylinder, and
    a cylinder rod, combined at a first end to the display main body and combined at a second end to the piston, such that the cylinder rod extends and retracts from the cylinder to vary the distance between the display main body and the base member; and
a cylinder supporter, with
    a first end contacting a first end of the cylinder and having a cylinder combining hole smaller than a diameter of the cylinder, through which the cylinder rod extends and retracts, and
    a second end combined with the base member.

17. The display apparatus according to claim 16, wherein the second end of the cylinder further comprises:
a cylinder bracket that combines with the base member.

18. A display apparatus comprising:
a display main body;
a base member;
a cylinder assembly combined to the base member and the display main body, that extends and retracts to vary a distance between the display main body and the base member, wherein the cylinder assembly further comprises
    a pressurized cylinder combined to the base member,
    a piston slidably provided in the cylinder, and
    a cylinder rod, combined at a first end to the display main body and combined at a second end to the piston, such that the cylinder rod extends and retracts from the cylinder to vary the distance between the display main body and the base member; and
at least one auxiliary cylinder assembly adjacent to the cylinder assembly, with a first end combined to the display main body, and a second end combined to the base member.

19. The display apparatus according to claim 18, wherein the at least one auxiliary cylinder comprises:
a guide pipe combined with the base member; and
a guide rod combined with the display main body, slidably provided in the guide pipe.

20. A display apparatus, comprising:
a display main body;
a base member;
a cylinder assembly combined to the base member and the display main body, that extends and retracts to vary a distance between the display main body and the base member;
at least one auxiliary cylinder assembly adjacent to the cylinder assembly, with a first end combined to the display main body, and a second end combined to the base member, the at least one auxiliary cylinder assembly comprising
    a guide pipe combined with the base member, and
    a guide rod combined with the display main body, slidably provided in the guide pipe; and
a cylinder supporter, with a first end accommodating and supporting respective first ends of the cylinder and the guide pipe, and a second end combined with the base member.

21. The display apparatus according to claim 20, wherein:
the first end of the cylinder supporter has
    a cylinder combining hole smaller than a diameter of the cylinder, through which the cylinder rod extends and contracts, and
    a pipe combining hole smaller than a diameter of the guide pipe, through which the guide rod extends and contracts.

* * * * *